Patented Dec. 8, 1942

2,304,722

UNITED STATES PATENT OFFICE 2,304,722

PARASITICIDAL MATERIAL

Eugene D. Witman, Columbus, Ohio, assignor to The Sherwin-Williams Company, Cleveland, Ohio, a corporation of Ohio No Drawing. Application September 19, 1938, Serial No. 230,658

2 Claims. (Cl. 167—15)

This invention relates to an improved form of basic copper arsenate and the method of making the same, and has for its principal object the formation of a material that will be adapted for use as an insecticide and fungicide.

Basic copper arsenate, as a natural mineral called olivenite was first analyzed by Klaproth in 1786, and subsequently by others. It has been prepared artificially by various methods, and Klumpp took out Patent 2,112,102 on March 22, 1938, for a method of producing basic copper arsenate that could be advantageously used in the extermination of noxious animals and plants. While it has been known that basic copper arsenate is highly toxic to insects, its use, heretofore, as an insecticide and fungicide for plants has been inhibited because of its phyto-toxic properties.

As the result of extensive research and actual tests of various forms of basic copper arsenate as a plant insecticide and fungicide I have found that basic copper arsenate prepared by the Klumpp process and all of the other processes disclosed in the existing literature on the subject are so highly phyto-toxic that they are wholly unsuited as insecticides or fungicides for plants, but I have also discovered that the unbroken crystals of basic copper arsenate are substantially non-phyto-toxic. This discovery indicated that if the powdered basic copper arsenate could be made by a process in which the crystals remained unbroken the material could be used as an insecticide and fungicide for plants.

In all of the processes of making basic copper arsenate heretofore known, the material is formed as a precipitate, and when the material is filtered out of the solution in which it is formed, the filter cake dries to a hard mass which must be ground to form a powder and I have discovered that it is this grinding operation that disintegrates the minute crystals and gives phyto-toxicity to the material. In the Klumpp process, as described in the above mentioned Klumpp patent, the crystals are less than about three ten-thousandths of a millimeter in size and crystals of this size when filtered out of the solution in which they are formed produce a filter cake which requires grinding to reduce to a powdered form.

I have discovered that in making basic copper arsenate if the temperature and concentration of the reactants are properly controlled during precipitation it is possible to produce the crystalline particles in sizes of from one one-thousandth to ten one-thousandths of a millimeter, and that particles of this size, when filtered and dried, form an easily friable cake, whereas particles ranging smaller in size form into a hard cake which, when dried, must be ground in order to reduce to a powder. I have also discovered that when the crystalline particles are larger than ten one-thousandths of a millimeter they have poor adhesive properties, when applied to plants, poor covering power, and lower insect toxicity.

I believe I am the first to discover that the phyto-toxic properties of basic copper arsenate result from a disintegration of the crystalline particles, and that by so controlling the reactants in the process, that crystalline particles range in size between one one-thousandth and ten one-thousandths of a millimeter, the dried filter cake may be readily reduced to a powder without grinding and, therefore, without disintegration of the crystals, with the result that I have been able to produce basic copper arsenate in a novel form which, from the standpoint of its use as a parasiticide, has properties and advantages not possessed by any basic copper arsenate heretofore known.

In general, my process of making the novel form of basic copper arsenate above described consists in forming the precipitate at a temperature of from 80° to 90° C. under such conditions of concentration of the reactants that the final mother liquor is only slightly acid (one-tenth of normal or less) and then forming the crystals by aging the slurry at a temperature of about 100° C.

As a specific example of my process, 200 grams of copper sulphate pentahydrate are dissolved in 300 ml. of water and then 36 ml. of 63.7 percent arsenic pentoxide solution is added. While stirring this solution so as to have complete and thorough dispersion of the constituents, and while maintaining the solution at a temperature of between 80° and 90° C., 82 grams of sodium carbonate ($Na_2CO_3$) is added in small portions to allow for the resulting reaction. After all of the sodium carbonate has been added the temperature of the slurry is raised to about 100° C. and maintained at this temperature until the material has crystallized. This usually requires about three hours to induce total crystallization. The basic copper arsenate is then separated from its mother liquor by filtration, then washed, dried and screened. The dried filter cake is so friable that the material may be readily forced through a fine screen and thus reduced to the form of a powder without any grinding.

In the above formula caustic soda might be used in place of sodium carbonate but I prefer to use the latter because of its ease of handling and cheapness.

Zinc sulphate may be used to replace any part of the copper sulphate, mol for mol, in the above formula, with the result that mixed crystals of basic zinc-copper arsenate may be formed. Also, any portion of the arsenic pentoxide, in the above formula, may be replaced with an equivalent quantity of phosphoric pentoxide, resulting in the formation of zinc or copper phosphates and arsenates, but these mixed compounds show varying insecticidal and fungicidal properties.

I have also found that in the manufacture of these basic salts it is advantageous to add about 4 percent of zinc bordeaux after the washing step and thoroughly mix it in with the basic salts to insure the formation of a material having extremely low plant-toxicity. In adding the zinc bordeaux four parts thereof, by weight, are added to each one hundred parts of the basic salts.

While I have described what I now consider to be the preferred method and have suggested certain alternatives, it is understood that other equivalent alternatives may be employed without departing from the spirit of the invention as defined in the appended claims.

Having thus described my invention, I claim:

1. A powdered insecticide and fungicide which is substantially non-phyto-toxic and comprises particles of basic copper arsenate in the form of unbroken crystals having a size of from one one-thousandth to ten one-thousandths of a millimeter.

2. A powdered basic copper arsenate that is substantially non-phyto-toxic and in the form of unbroken crystals having a size between one one-thousandth and ten one-thousandths of a millimeter.

EUGENE D. WITMAN.